US012572030B2

(12) United States Patent
Pollmann et al.

(10) Patent No.: US 12,572,030 B2
(45) Date of Patent: Mar. 10, 2026

(54) SPECTACLE LENS FOR A DISPLAY DEVICE WHICH CAN BE PLACED ONTO THE HEAD OF A USER AND GENERATES AN IMAGE, AND DISPLAY DEVICE COMPRISING SUCH A SPECTACLE LENS

(71) Applicant: tooz technologies GmbH, Aalen (DE)

(72) Inventors: Michael Pollmann, Koenigsbronn (DE); Georg Michels, Aalen (DE); Xuan Truong Nguyen, Berlin (DE)

(73) Assignee: tooz technologies GmbH, Aalen (DE)

( * ) Notice: Subject to any disclaimer, the term of this patent is extended or adjusted under 35 U.S.C. 154(b) by 362 days.

(21) Appl. No.: 18/134,024

(22) Filed: Apr. 12, 2023

(65) Prior Publication Data

US 2023/0333407 A1 Oct. 19, 2023

(30) Foreign Application Priority Data

Apr. 13, 2022 (DE) .......................... 102022109098.1

(51) Int. Cl.
G02C 7/02 (2006.01)
G02C 7/14 (2006.01)
G02B 27/01 (2006.01)

(52) U.S. Cl.
CPC ................. *G02C 7/02* (2013.01); *G02C 7/14* (2013.01); *G02B 27/0172* (2013.01); *G02B 2027/0178* (2013.01)

(58) Field of Classification Search
CPC .................................... G02C 7/02; G02C 7/14

USPC .......................................................... 351/41
See application file for complete search history.

(56) References Cited

U.S. PATENT DOCUMENTS

| | | | | |
|---|---|---|---|---|
| 4,220,400 A * | 9/1980 | Vizenor | ............. | G02B 27/0172 2/424 |
| 8,384,999 B1 * | 2/2013 | Crosby | .............. | G02B 27/0172 359/410 |
| 9,835,866 B2 * | 12/2017 | Widulle | ................... | G02B 5/10 |
| 2012/0002294 A1 | 1/2012 | Dobschal et al. | | |
| 2015/0036223 A1 | 2/2015 | Dobschal et al. | | |
| 2017/0192238 A1 | 7/2017 | Riedel et al. | | |
| 2018/0031839 A1 | 2/2018 | Schuster | | |

FOREIGN PATENT DOCUMENTS

| | | | | |
|---|---|---|---|---|
| DE | 102016124420 A1 | 6/2018 | | |
| WO | WO-2015044299 A1 * | 4/2015 | ......... | G02B 27/0081 |
| WO | WO-2015044305 A1 * | 4/2015 | ......... | G02B 27/0172 |

* cited by examiner

*Primary Examiner* — James R Greece
(74) *Attorney, Agent, or Firm* — Skaar Ulbrich Macari, P.A.

(57) ABSTRACT

A spectacle lens for a display device is of multi-shell construction. A first shell includes a first interface facing towards a second shell. The second shell includes a second interface facing towards the first shell. The two shells are connected to one another via the two interfaces. The deflection portion includes at least one reflective deflection element or a plurality of reflective deflection elements arranged next to one another that are formed in the second shell. At least one of the deflection elements projects relative to the second interface in order to serve as a spacer that predefines the spacing of the two shells connected to one another.

15 Claims, 3 Drawing Sheets

SPECTACLE LENS FOR A DISPLAY DEVICE WHICH CAN BE PLACED ONTO THE HEAD OF A USER AND GENERATES AN IMAGE, AND DISPLAY DEVICE COMPRISING SUCH A SPECTACLE LENS

PRIORITY

This application claims the benefit of German Patent Application No. 10 2022 109 098.1, filed Apr. 13, 2022, which is hereby incorporated herein by reference in its entirety.

FIELD

The present invention relates to a spectacle lens for a display device which can be placed onto the head of a user and generates an image, and to a display device comprising such a spectacle lens.

BACKGROUND

Spectacle lenses for display devices which can be placed onto the head of a user and generate an image are often used in so-called smartglasses, in which there is constantly a need to improve the quality of the image offered to the user.

SUMMARY

It is an object herein to provide a spectacle lens which, when used in smartglasses, as far as possible improves the quality of the image offered to the user.

In certain embodiments, the spectacle lens for a display device which can be placed onto the head of a user and generates an image comprises a front side, a back side, an entrance portion and a deflection portion spaced apart from the entrance portion, and also an exit portion in the back side. Furthermore, the spectacle lens comprises a light guiding channel, which guides light beams of the generated image, said light beams being coupled into the spectacle lens via the entrance portion of the spectacle lens, in the spectacle lens by means of at least one reflection (e.g. total internal reflection or reflection at a reflective layer) as far as the deflection portion, from which they are deflected in a direction towards the exit portion and are then coupled out of the spectacle lens through the exit portion.

The spectacle lens can be of multi-shell construction and comprises a first shell and a second shell connected to the first shell, wherein the first shell comprises a first interface facing towards the second shell, and the second shell comprises a second interface facing towards the first shell, and the two shells are connected to one another via the two interfaces. The deflection portion can comprise at least one reflective deflection element or a plurality of reflective deflection elements arranged next to one another, which are formed in the second shell, wherein at least one of the deflection elements projects (or is formed in elevated fashion) relative to the second interface in order to serve as a spacer that predefines the spacing of the two shells connected to one another.

During the production of the spectacle lens, it is thus possible to ensure that the spacing of the two shells that is predefined by the optical design is permanently present. Consequently, it is possible to reliably prevent undesired variations of the spacing even during series production or production of large numbers of items.

The at least one deflection element can comprise an effective flank having a reflective or partly reflective coating, wherein the effective flank projects relative to the second interface in order to serve as a spacer that predefines the spacing of the two shells connected to one another.

Furthermore, the at least one deflection element can comprise a transparent secondary flank, on which no reflective or partly reflective coating is applied. It may also be stated that the transparent secondary flank is free of a reflective or partly reflective coating. The secondary flank can project relative to the second interface in order to serve as a spacer that predefines the spacing of the two shells connected to one another.

Of course, a plurality of effective flanks or a plurality of secondary flanks can project relative to the second interface in order to serve as a spacer that predefines the spacing of the two shells connected to one another. Furthermore, it is possible for exactly one effective flank and exactly one secondary flank to project relative to the second interface in order to serve as a spacer that predefines the spacing of the two shells connected to one another. Furthermore, at least one effective flank and at least one secondary flank can project relative to the second interface in order to serve as a spacer that predefines the spacing of the two shells connected to one another.

With the plurality of reflective deflection elements arranged next to one another, a desired deflection function and, if appropriate, a certain imaging function of the deflection portion can be realized e.g. in a Fresnel-like manner. The reflective deflection elements can comprise reflective surface pieces, which may also be referred to as reflective facets or as effective flanks. The reflective surface pieces can each be formed in plane fashion. However, it is also possible for the reflective surface pieces themselves to be formed in curved fashion (for example in spherically or aspherically curved fashion).

The reflectivity of the respective reflective deflection elements or of the reflective facets can be for example in the range of 1-100% (including the limits of the range). Consequently, the reflective deflection elements or the reflective facets can be formed in partly reflective or reflective fashion.

In the spectacle lens, exactly one of the reflective deflection elements can serve as a spacer. This can be e.g. the reflective deflection element which has the smallest spacing with respect to the entrance portion, which has the largest spacing with respect to the entrance portion or which has neither the largest nor the smallest spacing with respect to the entrance portion.

However, it is also possible for two, three, four, five, six, seven, eight or nine reflective deflection elements or all reflective deflection elements of the deflection portion to serve as spacers.

The spectacle lens can comprise in particular a curved back side and/or a curved front side. The entrance portion can be formed in the back side. The curved back side can be realized by the interface of the second shell that faces away from the first shell. The curved front side can be formed by the interface of the first shell that faces away from the second shell. However, it is also possible for a coating and/or a further shell to be provided on the interface of the first shell that faces away from the second shell.

The spectacle lens can comprise exactly the first and second shells and thus be formed in two-shell fashion. However, a three-shell embodiment is also possible. Moreover, one or more coatings can be formed on interfaces of the shells.

The two interfaces of the two shells that face one another can be connected to one another by an adhesive layer (in particular optical adhesive or optical cement). The thickness of the adhesive layer is predefined by the projecting deflection element(s) and can be e.g. 30 μm to 1500 μm.

The second shell can comprise at least one further structure (or elevated structure) which projects relative to the second interface and which is spaced apart from the deflection portion and also serves as a spacer that predefines the spacing of the two shells connected to one another. The at least one further projecting structure can be formed integrally with the second shell.

In the spectacle lens, a structure predefining the geometric dimensions for the reflective deflection elements can be formed integrally with the second shell. This embodiment can be produced with the desired accuracy even in the case of large numbers of items (e.g. by means of injection moulding methods).

The two interfaces of the two shells that face one another can be formed in curved fashion.

What is furthermore provided is a display device comprising a holding device, which can be placed onto the head of a user, an image generating module, which is secured to the holding device and generates an (monochromatic or polychromatic) image, and a spectacle lens, which is secured to the holding device. By means of the spectacle lens, in the state in which the holding device has been placed onto the head, the generated image can be imaged in such a way that the user can perceive it as a virtual image.

The display device can comprise a control unit, which controls the image generating module. In particular, the control unit can control the image generating module on the basis of supplied image data.

The image generating module or the corresponding image generator unit can comprise in particular a planar image generator, such as e.g. an LCD module, an LCoS module, an OLED module or a tilting mirror matrix. Each image generator can comprise a plurality of pixels, which can be arranged e.g. in rows and columns. Each image generator can be self-luminous or not self-luminous, for example.

Each image generator can preferably generate a monochromatic image, different image generators generating monochromatic images having different wavelengths. The image generating module can also be formed in such a way that a multicoloured image is generated.

The image generating module can thus comprise a polychromatic image generator, a combination of two or more monochromatic image generators, or can comprise a combination of a dichromatic image generator and a monochromatic image generator. Typical configurations thereof comprising a plurality of image generators are realized e.g. by way of a beam splitter cube (also called X-Cube) or a so-called rod combiner and are known to a person skilled in the art.

It goes without saying that the features mentioned above and the features yet to be explained below can be used not only in the specified combinations but also in other combinations or on their own without departing from the scope of the present invention.

The invention is explained in more detail below on the basis of exemplary embodiments with reference to the accompanying drawings, which also disclose features that are essential to the invention. These exemplary embodiments are provided for illustration only and should not be construed as limiting. For example, a description of an exemplary embodiment having a multiplicity of elements or components should not be construed as meaning that all of these elements or components are necessary for implementation. Rather, other exemplary embodiments may also contain alternative elements and components, fewer elements or components, or additional elements or components. Elements or components of different exemplary embodiments can be combined with one another, unless stated otherwise. Modifications and variations that are described for one of the exemplary embodiments can also be applicable to other exemplary embodiments. In order to avoid repetition, elements that are the same or correspond to one another in different figures are denoted by the same reference signs and are not explained repeatedly.

DETAILED DESCRIPTION

Figure 1:
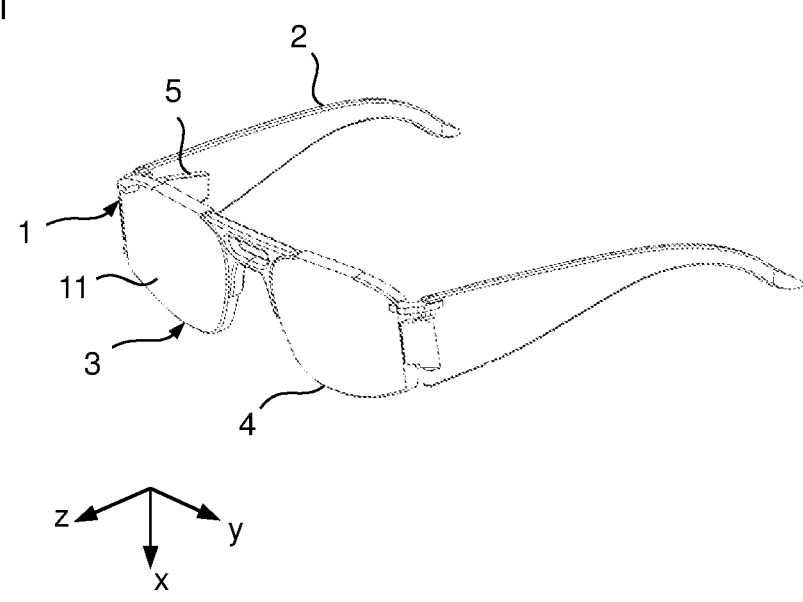
FIG. 1 shows a schematic perspective illustration of one embodiment of the display device.

In the case of the embodiment shown in FIG. 1, the display device 1 comprises a holding device 2, which can be placed onto the head of a user and can be formed e.g. in the manner of a conventional spectacle frame, and also a first spectacle lens 3 and a second spectacle lens 4, which are secured to the holding device 2. The holding device 2 with the spectacle lenses 3, 4 can be formed e.g. as sports goggles, sunglasses and/or spectacles for correcting defective vision, wherein a virtual image can be introduced into the user's field of view via the first spectacle lens 3, which is formed as a spectacle lens and which may also be referred to as a multifunctional lens, as described below.

Figure 2:
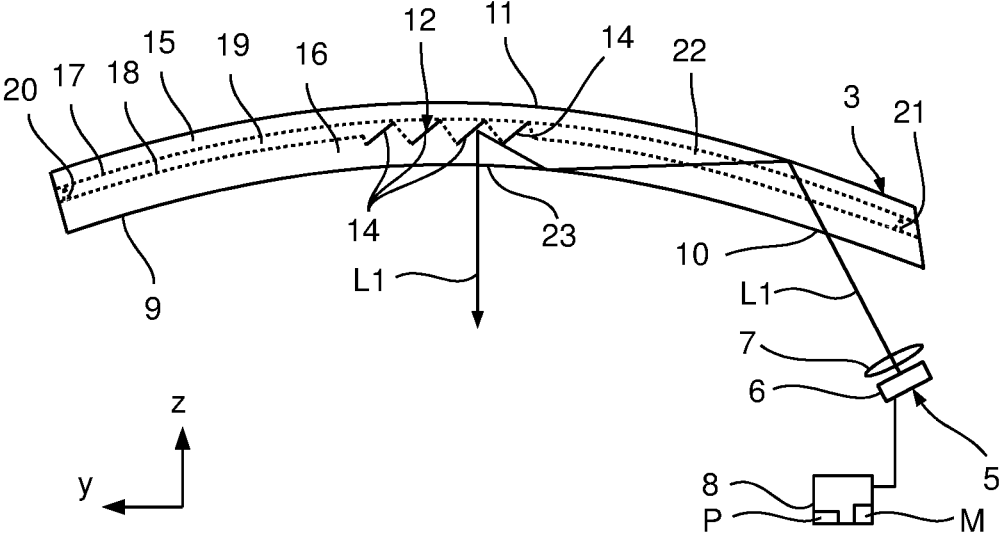
FIG. 2 shows an enlarged sectional view of the first spectacle lens, including a schematic illustration of the image generating module.

For this purpose, the display device 1 comprises an image generating module 5, which can be arranged in the region of the right-hand spectacle earpiece of the holding device 2, as illustrated schematically in FIG. 1. The image generating module 5 can comprise an image generating element 6 for generating an (monochromatic or multicoloured) image and an image generator optical unit 7 disposed downstream of the image generating element 6 (FIG. 2). The image generating element 6 can be formed as a planar image generating element 6, e.g. as an OLED element, an LCD element, an LCoS element or a tilting mirror matrix, each comprising a multiplicity of pixels arranged e.g. in rows and columns. For the light beams emitted by the planar image generating element 6, a single light beam L1 is depicted schematically in a representative manner.

As can furthermore be gathered from FIG. 2, the image generating module 5 furthermore comprises a control unit 8 having e.g. a processor P and a memory M for controlling the image generating module 5. Depending on supplied image data, the control unit 8 controls the image generating module 5, and in particular the image generating element 6, in such a way that the desired image is generated and corresponding light beams L1 are thus generated and enter the spectacle lens 3 via a curved back side 9 thereof. The region of entrance at the back side 9 may also be referred to as entrance portion 10.

The spectacle lens 3 furthermore comprises a curved front side 11 and also a deflection portion 12 formed in a manner buried in the spectacle lens 3.

The deflection portion 12 comprises a plurality of reflective deflection elements 14, which may also be referred to as reflective facets. The reflectivity of the reflective deflection elements 14 can be in the range of 1-100%, for example.

Furthermore, FIG. 2 schematically illustrates that the spectacle lens 3 is formed in multi-shell fashion with an outer shell 15 and an inner shell 16, wherein the interfaces 17, 18 of the two shells 15, 16 that face one another are connected by an adhesive 19. The adhesive 19 has a refractive index matched to the basic material of the two shells 15, 16, with the result that the interfaces 17, 18 depicted by means of dashed lines and the layer comprising the adhesive 19 are not visible in the finished spectacle lens 3.

As is indicated in FIG. 2, the reflective deflection elements 14 are formed such that they project relative to the interface 18 of the inner shell 16 and thus serve as spacers in the course of the joining of the two shells 15 and 16. Therefore, a desired spacing of the two interfaces 17, 18 in the course of joining (here adhesive bonding by way of the adhesive 19) is predefined and can be reliably maintained during joining.

Of course, it is also possible for the reflective deflection elements 14 to be formed as part of the outer shell 15 and to project relative to the interface 17 of the outer shell (not shown). In this case, too, the reflective deflection elements 14 serve as spacers in the course of the joining of the two shells 15, 16. Hereinafter, the shell 15 in which the reflective deflection elements 14 are not formed is also referred to as first shell, and the shell 16 in which the reflective deflection elements 14 are formed is also referred to as second shell.

The outer shell 15 and/or the inner shell 16 can comprise even further projecting structures in order to reliably ensure the desired spacing in the course of joining via the entire interfaces 17, 18 of the shells 15, 16. In the case of the exemplary embodiment described here, the inner shell 16 or the second shell 16 additionally comprises two projecting structures 20, 21.

As has already been described, the light beams L1 enter the spectacle lens 3 via the entrance portion 10 in the back side 9. The light beams L1 are then guided in the spectacle lens 3 e.g. by way of total internal reflection at the back side 9 and front side 11 as far as the deflection portion 12, such that there is a light guiding channel 22 from the entrance portion 10 as far as the deflection portion 12. The deflection portion 12 then deflects the light beams L1 towards the back side 9 in such a way that the deflected light beams L1 emerge from the spectacle lens 3 via the back side 9. The region via which the light beams L1 emerge may also be referred to as exit portion 23.

Since the light guiding takes place by way of total internal reflection at the front side 11 and thus the side of the first shell 15 facing away from the second shell 16 and also by way of total internal reflection at the back side 9 and thus at the side of the second shell 16 facing away from the first shell 15, it is important for the spacing of the two shells 15, 16 in the joined state to correspond to the optical design specification as exactly as possible. This is ensured by the spacer function of the reflective deflection elements 14.

The image generating module 5 and the spectacle lens 3 are designed in such a way that a user wearing the display device 1 on the head can perceive the image generated by means of the image generating module 5 as a virtual image. Depending on the reflectivity of the deflection elements 14, the user can perceive the virtual image superimposed with the surroundings. In the case of a very high reflectivity, and in particular in the case of a reflectivity of 100%, the user can perceive only the virtual image, and not the surroundings, at least in the region of the deflection portion 12.

Figure 3:
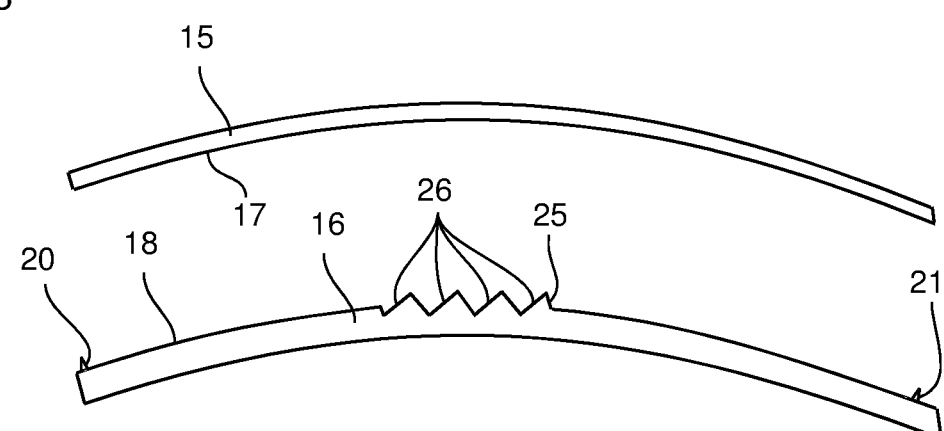
FIGS. 3 and 4 show illustrations for elucidating the production of the spectacle lens in accordance with FIG. 2.
Figure 4:
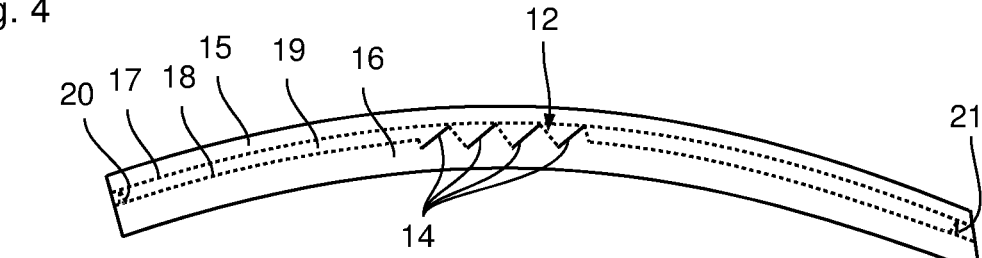

One advantageous way of producing the first reflective deflection elements 14 comprises the step of producing the two shells 15, 16 matching one another, one of the two shells (here the second shell 16) comprising a structure 25 for the reflective deflection elements 14. The shells 15, 16, which may also be referred to as half-shells, can be produced by means of injection moulding, for example. The desired splitter coating 26 (or the desired reflective coating 26) is applied to the structure 25 (FIG. 3) and then the two shells 15, 16 are joined by means of the adhesive 19 (FIG. 4). In this case, the adhesive-bonding gap predefined by the spacer function of the reflective deflection elements 14 can have e.g. a thickness in the range of approximately 30 μm to 1500 μm, the spectacle lens 3 shown in FIG. 4 thus being produced. The central layer comprising the adhesive is depicted here merely for the purpose of illustrating production. This is no longer visible in the spectacle lens 3 actually produced, owing to the refractive index matching.

Figure 5:
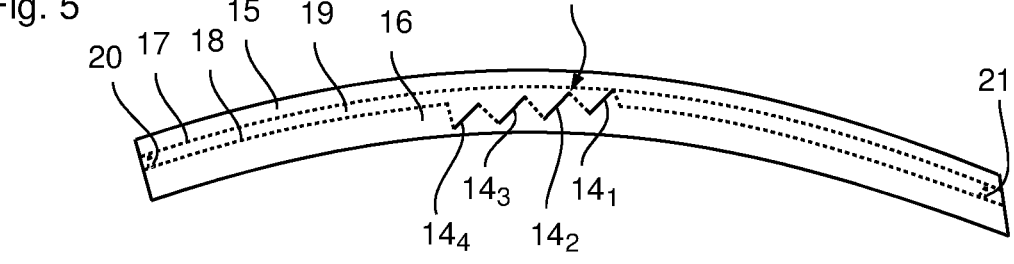
FIG. 5 shows an enlarged sectional view of the first spectacle lens of a further embodiment.

FIG. 5 shows a modification of the spectacle lens 3. In this modification, only the reflective deflection element $14_1$ (also referred to hereinafter as first reflective deflection element) serves as a spacer having the smallest spacing with respect to the entrance portion 10. This can be achieved e.g. by virtue of the first reflective deflection element $14_1$ projecting relative to the second interface 18 by the largest absolute value in comparison with the rest of the deflection elements $14_2$-$14_4$.

Figure 6:
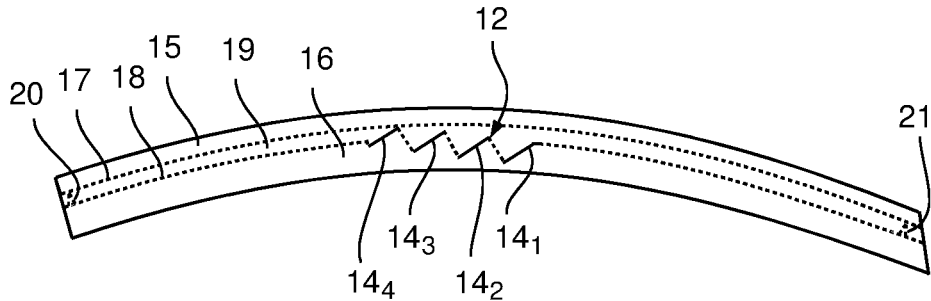
FIG. 6 shows an enlarged sectional view of the first spectacle lens of a further embodiment.

FIG. 6 shows a further modification of the spectacle lens 3. In this modification, only the reflective deflection element $14_4$ (also referred to hereinafter as fourth reflective deflection element) serves as a spacer having the largest spacing with respect to the entrance portion 10. This can be achieved e.g. by virtue of the fourth reflective deflection element $14_4$ projecting relative to the second interface 18 by the largest absolute value in comparison with the rest of the deflection elements $14_1$-$14_3$.

Figure 7:
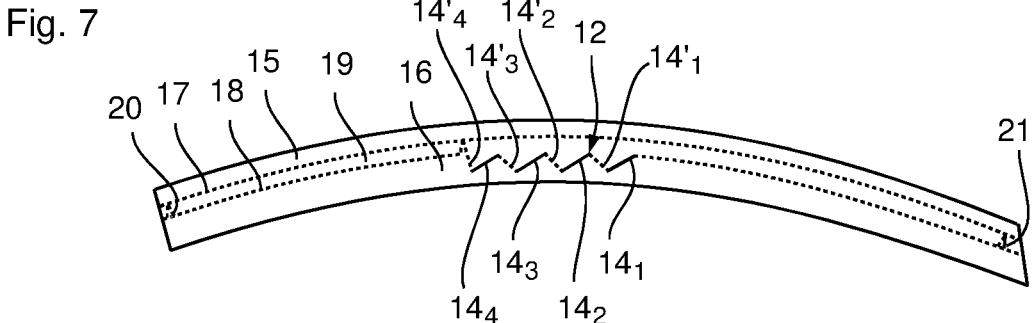
FIG. 7 shows an enlarged sectional view of the first spectacle lens of a further embodiment.

In the case of the embodiments described previously, that part of the reflective deflection elements $14_1$-$14_4$ which has the desired splitter coating 26 or the desired reflective coating 26 serves as a spacer in each case. The aforesaid part of the reflective deflection elements may also be referred to as an effective flank. However, the reflective deflection elements $14_1$-$14_4$ also comprise second flanks $14'_1$-$14'_4$, on which no splitter coating 26 or no reflective coating 26 is applied. The aforesaid second flanks, which may also be referred to as disturbing flanks or secondary flanks, are thus transparent to the light beams L1. FIG. 7 shows an embodiment in which the secondary flank $14'_4$ of the fourth reflective deflection element $14_4$ projects relative to the interface 18 of the inner shell 16 and thus serves as a spacer in the course of the joining of the two shells 15 and 16. Consequently, in the case of this embodiment in accordance with FIG. 7, the deflection portion 12 comprises exactly one spacer formed by the fourth secondary flank $14'_4$.

Of course, it is also possible for another of the secondary flanks or a plurality of secondary flanks to project relative to the interface 18 of the inner shell 16 and thus serve as spacers in the course of the joining of the two shells 15 and 16. Moreover, it is possible for one or more effective flanks and one or more secondary flanks to project relative to the interface 18 of the inner shell 16 and thus serve as spacers in the course of the joining of the two shells 15 and 16.

The display device 1 can also be formed in such a way that the left spectacle lens 4 is formed as a multifunctional lens in the manner as described in association with FIGS. 1 to 6. In this case, the image generating module 5 is preferably arranged in the region of the left spectacle earpiece. Furthermore, it is possible for both the left spectacle lens 3 and the right spectacle lens 4 to be formed as a multifunctional lens, a separate image generating module 5 preferably being arranged for each spectacle lens 3, 4 (preferably in the left and right spectacle earpieces).

The deflection portion 12 can have the effect purely of beam deflection. Preferably, it can additionally provide an imaging effect.

What is claimed is:

1. A spectacle lens for a display device which can be placed onto the head of a user and generate an image, the spectacle lens comprising:

a front side;

a back side;

an entrance portion;

a deflection portion spaced apart from the entrance portion;

an exit portion in the back side; and a light guiding channel, which guides light beams of the generated image, said light beams being coupled into the spectacle lens via the entrance portion of the spectacle lens, in the spectacle lens via at least one reflection as far as the deflection portion, from which they are deflected in a direction towards the exit portion and are then coupled out of the spectacle lens through the exit portion, wherein the spectacle lens comprises a multi-shell construction, including a first shell and a second shell connected to the first shell, wherein the first shell comprises a first interface facing towards the second shell, and the second shell comprises a second interface facing towards the first shell, and the two shells are connected to one another via the first and second interfaces, wherein the deflection portion comprises at least one reflective deflection element or a plurality of reflective deflection elements arranged next to one another, which are formed in the second shell, and wherein at least one of the deflection elements projects relative to the second interface in order to serve as a spacer that predefines the spacing of the first and second shells connected to one another.

2. The spectacle lens of claim 1, wherein the at least one deflection element comprises an effective flank having a reflective or partly reflective coating, wherein the effective flank projects relative to the second interface in order to serve as a spacer that predefines the spacing of the first and second shells connected to one another.

3. The spectacle lens of claim 2, wherein the at least one deflection element comprises a transparent secondary flank, on which no reflective or partly reflective coating is applied, wherein the secondary flank projects relative to the second interface in order to serve as a spacer that predefines the spacing of the first and second shells connected to one another.

4. The spectacle lens of claim 2, wherein the second shell comprises at least one further structure which projects relative to the second interface, which is spaced apart from the deflection portion, and also serves as a spacer that predefines the spacing of the first and second shells connected to one another.

5. The spectacle lens of claim 4, wherein the at least one further projecting structure is formed integrally with the second shell.

6. The spectacle lens of claim 1, wherein the at least one deflection element comprises a transparent secondary flank, on which no reflective or partly reflective coating is applied, wherein the secondary flank projects relative to the second interface in order to serve as a spacer that predefines the spacing of the first and second shells connected to one another.

7. The spectacle lens of claim 1, wherein the first and second interfaces are connected to one another by an adhesive layer.

8. The spectacle lens of claim 1, wherein the second shell comprises at least one further structure, which projects relative to the second interface, and which is spaced apart from the deflection portion, and also serves as a spacer that predefines the spacing of the first and second shells connected to one another.

9. The spectacle lens of claim 8, wherein the at least one further projecting structure is formed integrally with the second shell.

10. The spectacle lens of claim 1, wherein a structure predefining the geometric dimensions for the reflective deflection elements is formed integrally with the second shell.

11. The spectacle lens of claim 1, wherein the first and second interfaces are formed in curved fashion.

12. The spectacle lens of claim 1, wherein the interface of the second shell that faces away from the first shell forms the back side of the spectacle lens.

13. The spectacle lens of claim 1, wherein exactly one of the deflection elements serves as a spacer.

14. The spectacle lens of claim 1, wherein at least two deflection elements serve as spacers.

15. A display device, comprising:

a holding device, which can be placed onto the head of a user;

an image generating module, which is secured to the holding device and generates an image; and the spectacle lens of claim 1, which is secured to the holding device and, in the state in which the holding device has been placed on the head of the user, images the generated image such that the user can perceive the generated image as a virtual image.

* * * * *